Jan. 18, 1944.    N. WEBER    2,339,591
LOCKING DEVICE
Filed May 22, 1942    3 Sheets-Sheet 1

INVENTOR.
NICHOLAS WEBER
BY V. Alexander Scher
ATTORNEYS

Jan. 18, 1944. N. WEBER 2,339,591
LOCKING DEVICE
Filed May 22, 1942 3 Sheets-Sheet 2
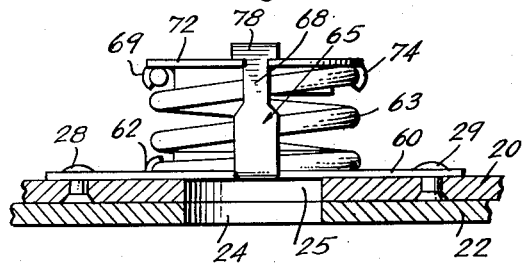
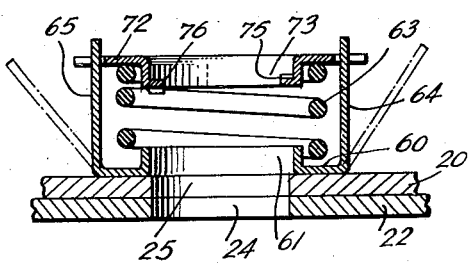
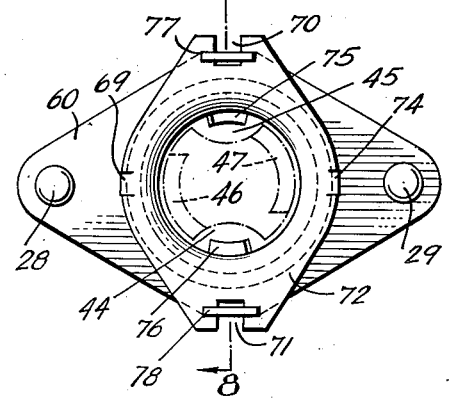
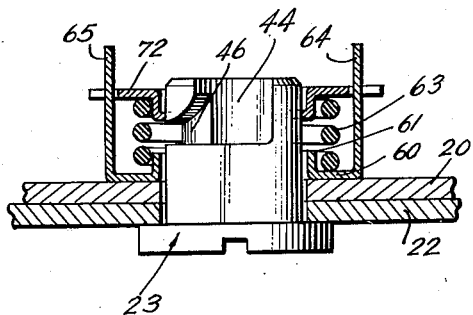
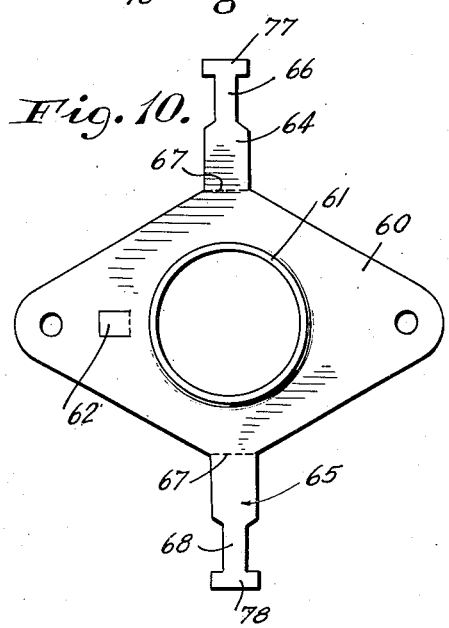
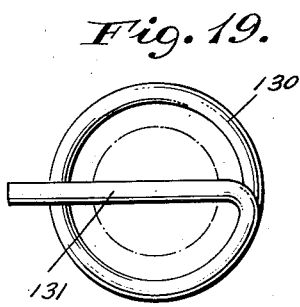
INVENTOR.
NICHOLAS WEBER
BY V. Alexander Scher
ATTORNEYS Jan. 18, 1944. N. WEBER 2,339,591
LOCKING DEVICE
Filed May 22, 1942 3 Sheets-Sheet 3
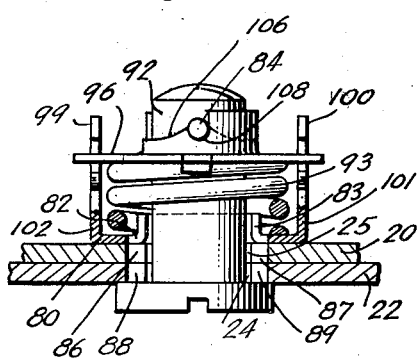
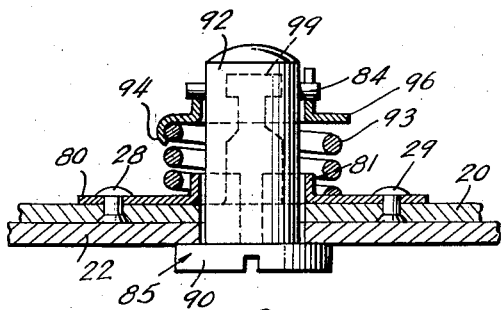
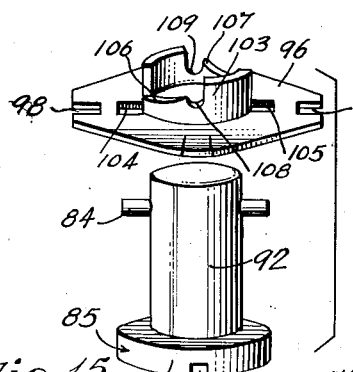
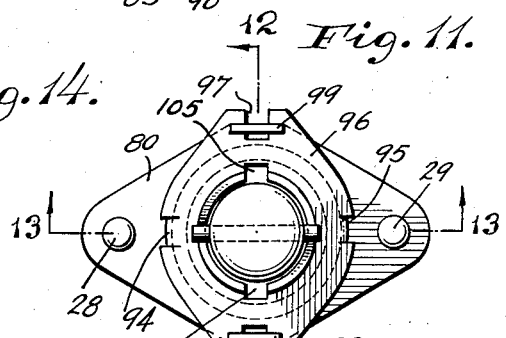
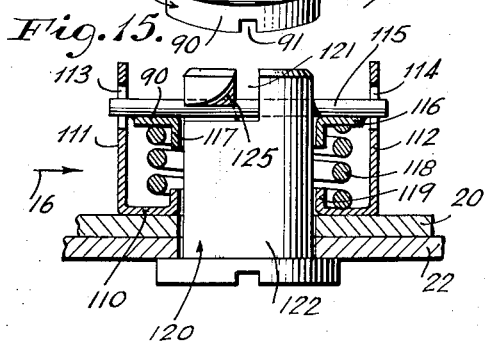
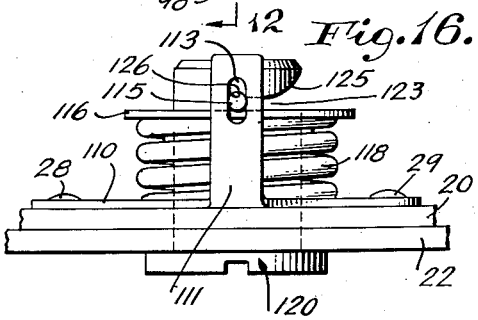
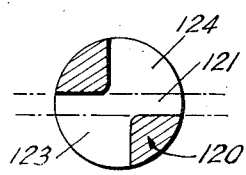
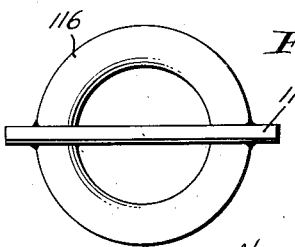
INVENTOR.
NICHOLAS WEBER
BY V. Alexander Scher
ATTORNEYS Patented Jan. 18, 1944

2,339,591

UNITED STATES PATENT OFFICE 2,339,591

LOCKING DEVICE

Nicholas Weber, Teaneck, N. J.

Application May 22, 1942, Serial No. 444,123

14 Claims. (Cl. 24—221)

This invention relates to a locking device and refers more particularly to a fastening device which is designed to connect together sheet elements made of metal or the like, and which may be used as a lock for covers, doors, hoods, and various other articles.

It is among the objects of the present invention to provide a simple locking construction which will be of inexpensive manufacture and which may be readily actuated by hand or by suitable tools to make a rigid connection which will not become loose even though subjected to considerable vibration and which may be utilized for lengthy time periods without excessive damage or breakage.

Another object is the provision of a locking device which requires a minimum of space, all parts being concentrated around the key.

Other objects are obvious or will appear in the course of the following specification.

In accomplishing the objects of the present invention it was found most satisfactory to provide a key member having recessed or projecting portions adapted to cooperate with projecting or recessed elements constituting a part of a lock. The lock may include a coil spring carried by a supporting plate and carrying a ring which may be provided with the aforesaid projecting or recessed elements. The interengaging parts of the lock and key may include inclined sliding surfaces as well as recesses or pockets for the locking of the projecting parts. The coil spring may be compressed solely during the locking, or it may be always maintained under tension by arms constituting a part of the supporting plate. The locking projections of the device may consist of small inclined pieces forming a part of the ring, or they may consist of a transverse pin carried by the key, the ring or the spring.

The invention will appear more clearly from the following detailed description when taken in connection with the accompanying drawings showing, by way of example, preferred embodiments of the inventive idea.

In the drawings:

Figure 2 is a section along the line 2—2 of Figure 1, the key being shown separately and in side elevation.

Figure 3 is a section along the line 3—3 of Figure 1, with the key removed.

Figure 4 is similar to Figure 2, but shows the key in its locking or latched position.

Figure 5 is a section through the key along the line 5—5 of Figure 2.

Figures 6 to 10 show an alternative embodiment wherein the spring is always held under tension, Figure 6 being a rear view of the lock.

Figure 7 shows the construction partly in side elevation and partly in section.

Figure 8 is a section along the line 8—8 of Figure 6.

Figure 9 is similar to Figure 8 and shows the key in the locking position.

Figure 10 shows in front elevation the supporting plate carrying spring-tensioning arms.

Figures 11 to 14 show yet another embodiment of a locking construction, Figure 11 being a rear view.

Figure 12 is partly a side elevation and partly a section along the line 12—12 of Figure 11.

Figure 13 is a section along the line 13—13 of Figure 11.

Figure 14 is a perspective view illustrating the key and the ring member cooperating therewith.

Figures 15 to 18 show a locking construction of yet another type, Figure 15 being a longitudinal section through the lock, the key being shown in side elevation.

Figure 16 shows the construction in side elevation, looking in the direction of the arrow 16 in Figure 15.

Figure 17 is a top view of the ring carrying a locking pin.

Figure 18 is a section through the key.

Figure 19 illustrates in top view a construction wherein a locking pin constitutes a part of a coil spring.

Figure 2:
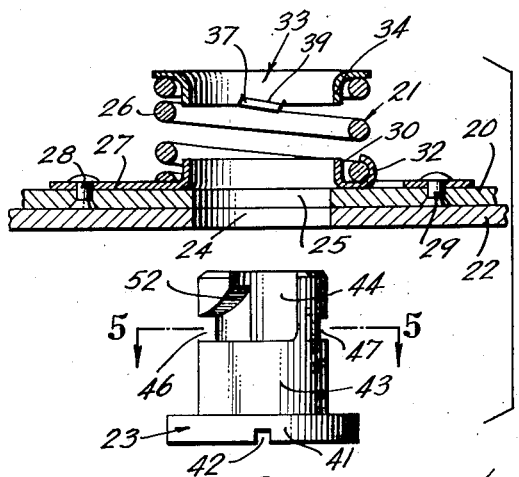
Figures 1 to 5 show one type of locking construction, Figure 1 being a rear view of the locking construction in an unlatched position.
Figure 3:
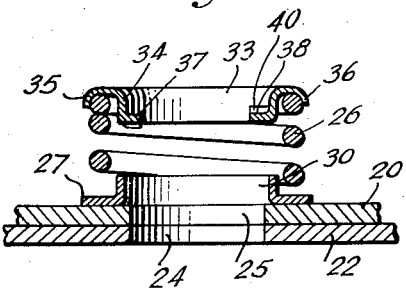
Figure 1:
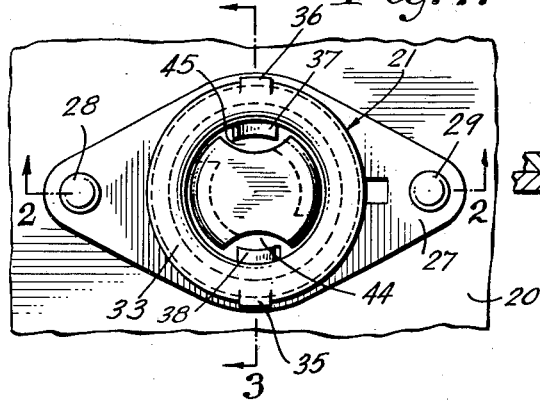
Figure 4:
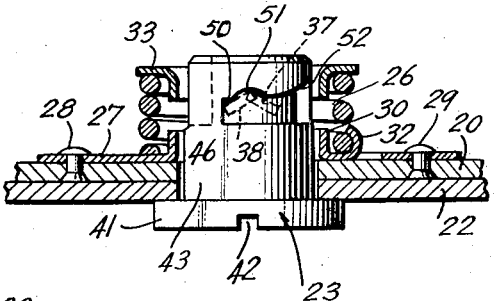

The locking device shown in Figures 1 to 5 comprises a resilient lock generally designated by the numeral 21 and carried upon a main plate or part 20. A movable plate or part 22 is adapted to be locked with the plate 20 by a key 23.

The plates 20 and 22 are provided with alined openings 25 and 24, respectively, which may receive the key 23. The opening 25 is enclosed by a flange 30 of a supporting plate 27 which carries a coil spring 26 and which is attached by rivets 28 and 29 to the plate 20. A lug or tongue 32 is cut out of the plate 27 and is bent over the innermost coil of the spring 26 to hold the spring in place.

A ring 33 is carried by the outer end coil of the spring 26 and has a tubular flange portion 34 situated within that coil, while lugs 35 and 36 which are a part of the ring, extend around the coil and hold the ring 33 firmly in place.

The ring 33 carries two inwardly projecting elements 37 and 38 which are situated diametrically opposite each other. The projection 37 has a key-engaging surface 39 which is inwardly inclined in the direction from the left hand side of Figure 2 to its right hand side. The projection 38 has a key-engaging surface 40 which is inclined in the opposite direction, as indicated by broken lines in Figure 4, which shown that planes passing through these surfaces will intersect each other substantially in the middle.

Figure 5:
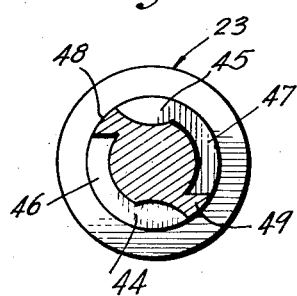

The key 23 is provided with a wide base 41 having a slot 42 which may be operated by a screw driver or the like. The cylindrical shank 43 of the key 23 has two similar wide grooves or recesses 44 and 45 extending diametrically opposite each other in the longitudinal direction of the key 23 to the outer end of the cylindrical shank 43. In addition, the key 23 has two transverse grooves 46 and 47 which are also similar to each other in form and are situated diametrically opposite each other. As shown in Figure 5, webs 48 and 49 separate the grooves 46 and 47 which join the recesses 44 and 45, respectively. Each groove has a straight portion 50, a recess or pocket 51 and an inclined portion 52 which joins a longitudinal recess.

In operation, the device may be locked by inserting the key 23 into the openings 24 and 25 and inside the spring 26, the projections 37 and 38 being situated in the recesses 45 and 44 respectively of the key. After the key has been inserted to its full extent, it is turned so that the projections 37 and 38 enter the grooves 46 and 47 and rest finally in the recesses or pockets 51 thereof. The coil spring 26 is somewhat compressed during this locking operation which provides a firm and rigid lock.

The locking device illustrated in Figures 6 to 10 comprises a supporting plate 60 which is attached by rivets 28 and 29 to the main plate 20. The plate 20 has the opening 25 which is in alignment wtih the opening 24 of the other main plate 22.

The supporting plate 60 has the round flange 61 enclosing the opening 25, and a cut out tongue or lug 62 which embraces and holds the end coil of a coil spring 63. The plate 60 is provided with two arms 64 and 65.

The arm 64 has a narrow recessed portion 66 and a wider top portion 77. The arm 65 has a similar narrower portion 68 and a wider top 78. The two arms 64 and 65 are somewhat bent along the lines 67 (Fig. 10), when the plate 60 is being mounted upon the plate 20, as illustrated in Figure 8. Then the arms 64 and 65 are bent further, so that they extend at right angles to the plate 60 and so that their recessed portions 66 and 68 enter recesses 70 and 71 provided in an upper plate or ring member 72.

The ring member 72 has a tubular flange 73 which is situated within the outer coil of the spring 63. This coil of the spring is connected to the ring member 72 by means of lugs or tongues 69 and 74. The ring member 72 is also provided with inner key-engaging projections 75 and 76 which are similar to the projections 37 and 38 of Figures 1 and 3.

The ring 72 is held firmly on both sides by the arms 64 and 65. The upper wider portions 77 and 78 of these arms are situated above the recesses 70 and 71 and cause the ring member 72 to exert a compressive force upon the spring 63. Thus the purpose of the arms 64 and 65 is to hold the coil spring 63 through the ring 72 under any desired initial compression and also to prevent the ring 72 from turning when the key is turned.

The key 23 may be of the same form as the one described in the construction shown in Figures 1 to 5.

In operation, the key 23 is inserted into the openings 24 and 25 and inside the coil spring 63 with the recesses 44 and 45 of the key receiving the projections 76, 75, respectively, of the ring member 72. Then the key 23 is turned so that the projections 75 and 76 will be situated within the pockets provided in the transverse grooves 46 and 47 of the key.

The advantage of this construction is that the arms 64 and 65 maintain the spring 63 always under tension, the compression of the spring 63 being increased when the device is locked, so that a very firm and rigid lock is provided. Another advantage is that the torque exerted by turning the key is taken up by the arms so that there is a minimum of angular movement of the ring 72.

The locking device shown in the Figures 11 to 14 comprises a supporting plate 80 which is similar in form to the plate 60 and which is connected by rivets 28 and 29 with a main plate 20. The supporting plate 80 has a flange 81 which is situated above the opening 25 of the plate 20 and which is situated within an end coil of a coil spring 93. The flange 81 and the adjacent portions of the plate 80 are provided with narrow recesses 82 and 83 situated diametrically opposite each other and providing a passage for a locking pin 84 which is carried by a key 85. The opening 25 is provided with similar recesses 86 and 87, while the opening 24 of the main plate 22 also has similar recesses 88 and 89. It is apparent that the recesses 82, 86 and 88 are in alignment with each other, while the recesses 83, 87 and 89 are also in alignment.

The key 85 has a wider head 90 having a slot 91 for a screw-driver, while the shank 92 of the key consists of a smooth cylindrical body carrying the pin 84.

The coil spring 93 which is mounted upon the plate 80, has an upper coil which is held by lugs 94 and 95 of an upper plate or ring member 96. The ring 96 has recesses 97 and 98 which contain the upper ends 99 and 100 of the arms 101 and 102. These arms are similar to the arms 64 and 65 and are integral with the plate 80.

The ring 96 has a flange portion 103 which is divided by diametrically opposed recesses 104 and 105. The upper edges of the flange 103 are used for locking the pin 84 of the key 85, and for this purpose these upper edges have inclined portions 106 and 107 situated adjacent the recesses 104 and 105, as well as pockets 108 and 109 which are adapted to receive the ends of the locking pin 84.

In operation, the key 85 is inserted through the openings 24 and 25 and into the interior of the spring 93, with the ends of the locking pin 84 passing through the recesses 88, 86, 82, 104, and 89, 87, 83, 105. Then the key 85 is turned with the ends of the pin 84 sliding upon the edges 106 and 107 of the flange 103, and fitting into the pockets 108 and 109.

In this construction, in which the spring 93 is maintained under tension by the arms 102 and 101, the key 85 is of very simple form so that it can be quickly and inexpensively manufactured. The provision of the edges 106 to 109 in the flange 103 is obviously a less expensive and more convenient operation than the cutting of grooves 46 and 47 in the key 23 of Figure 5.

The locking device shown in Figures 15 to 18 of the drawings includes a supporting plate 110 which is attached by rivets 28 and 29 to a main plate 20. The supporting plate 110 has two arms 111 and 112, the upper ends of which have longitudinal slots 113 and 114 which receive the ends of a locking pin 115. In this construction, the locking pin 115 is connected to an upper ring 116 by spot welding or the like (Fig. 17). The ring 116 is provided with an inner tubular flange 117 enclosed by the upper coil of the spring 118. The lower coil of the spring 118 encloses a tubular flange 119 which is integral with the plate 110.

The key 120 of this construction has a recess or slot 121 which extends across the entire upper end of the tubular shank 122 of the key 120. The transverse recess 121 communicates with transverse grooves 123 and 124 which have inclined surfaces 125 and pockets 126 receiving the pin 115.

In operation, the key 120 is inserted through the openings of the plates 22 and 20 and into the interior of the coil spring 118, the recess 121 of the key 120 receiving the transverse pin 115. As already stated, the pin 115 the ends of which are situated in slots 113 and 114, is firmly connected with the ring 116 which is carried upon the coil spring 118. When the key 120 is turned the inclined surfaces 125 of the grooves 123 and 124 will slide upon the pin which will rest in the pockets 126.

In this construction, the locking pin 115 constitutes a part of the lock, while the shank 122 of the key 120 has no projecting portions.

A locking pin may constitute a part of a coiled spring, instead of being a part of the ring carried by the spring. This alternative embodiment is illustrated in Figure 19 which shows a coiled spring 130, the upper coil of which is bent diametrically to form a transverse locking pin 131. In other respects this embodiment may be of the same form as the ones previously described.

It is apparent that the specific illustrations shown above have been given by way of illustration and not by way of limitation and that the structures above described are subject to wide variations and modifications without departing from the scope or intent of the invention, all of which variations and modifications are to be included within the scope of the present invention.

What is claimed is:

1. In a fastening device for a plurality of parts with openings, a lock comprising a supporting plate carried by one of said parts, a coil spring member carried by said plate, a ring member carried by said coil spring member, means carried by one of said members for locking engagement with correspondingly shaped parts of a key inserted through said openings, and means connected with said plate and engaging said ring member to prevent torsional movement thereof during locking.

2. In a fastening device for a plurality of parts with openings, a lock comprising a supporting plate carried by one of said parts, a coil spring carried by said plate, and a ring member carried by said coil spring, said ring member being in alinement with said openings and comprising surfaces adapted to engage parts of a key inserted through said openings.

3. In a fastening device for a plurality of parts with openings, a lock comprising a supporting plate carried by one of said parts, a coil spring carried by said plate, and a ring member carried by said coil spring, said ring member being in alinement with said openings and comprising surfaces situated in the path of a turning movement of parts of a key inserted through said openings to engage said parts and lock the device.

4. In a fastening device for a plurality of parts with openings, a lock comprising a supporting plate carried by one of said parts, a coil spring carried by said plate, and a ring member carried by said coil spring, said ring member being in alinement with said openings and comprising at least one inwardly directed projection for engagement with recesses of a key inserted through said openings, whereby said spring is compressed by the key.

5. In a fastening device for a plurality of parts with openings, a lock comprising a supporting plate carried by one of said parts, a coil spring carried by said plate, and a ring member carried by said coil spring, said ring member being in alinement with said openings and comprising two inwardly directed projections situated diametrically opposite each other and having surfaces which are inclined in opposite directions and which are adapted to engage recesses of a key inserted through said openings and turned therein, whereby said spring is compressed by the key.

6. A key for locking a fastening device described in claim 5, said key comprising a cylindrical shank portion having formed therein recesses extending in the longitudinal direction of the key to the end of said shank portion, and two grooves extending transversely to said direction, each of said grooves having inclined surfaces adjacent a separate recess and a pocket for receiving one of the projections of the fastening device, said shank portion having a web separating the two grooves.

7. In a fastening device for a plurality of parts with openings, a lock comprising a supporting plate carried by one of said parts, a coil spring carried by said plate, and a ring member carried by said coil spring, said supporting plate comprising at least one arm engaging said ring member, said ring member being in alinement with said openings and comprising surfaces adapted to engage parts of a key inserted through said openings and turned therein, whereby said coil spring is compressed by the key.

8. In a fastening device for a plurality of parts with openings, a lock comprising a supporting plate carried by one of said parts, a coil spring carried by said plate, and a ring member carried by said coil spring, said supporting plate comprising two arms situated opposite each other and having recessed portions, said ring member being in alinement with said openings and having recesses formed therein and receiving the recessed portions of said arms and further having surfaces adapted to engage parts of a key inserted through said openings and turned therein, whereby said coil spring is compressed by the key.

9. In a fastening device for a plurality of parts with openings, a lock comprising a supporting plate carried by one of said parts, a coil spring carried by said plate, and a ring member carried by said coil spring, said ring member comprising a flange portion which is in alignment with said openings and which comprises edges adapted to be engaged by a pin of a key inserted through said openings and turned therein, whereby said coil spring is compressed by the key.

10. In a fastening device for a plurality of parts with openings, a lock comprising a supporting plate carried by one of said parts, a coil spring carried by said plate, and a ring member carried by said coil spring, said supporting plate comprising two arms situated opposite each other, said ring member having recesses formed therein and receiving said arms and further having a flange portion which is in alinement with said openings and which comprises edges adapted to be engaged by a pin of a key inserted through said openings and turned therein, whereby said coil spring is compressed by the key.

11. In a fastening device for a plurality of parts with openings, a lock comprising a supporting plate carried by one of said parts, a coil spring carried by said plate, and a ring member carried by said coil spring, said ring member comprising a flange portion which extends in the direction of the coil spring and which is in alinement with said openings, said flange portion having edges which comprise two pockets, inclined portions adjacent said pockets and recesses adjacent said inclined portions for receiving the ends of a pin carried by a key inserted through said openings and turned therein, whereby said coil spring is compressed by the key.

12. In a fastening device for a plurality of parts with openings, a lock comprising a supporting plate carried by one of said parts, a coil spring carried by said plate, and a ring member carried by said coil spring, said ring member comprising a flange portion which extends in the direction of the coil spring and which is in alinement with said openings, said flange portion having edges which comprise two pockets, inclined portions adjacent said pockets and recesses adjacent said inclined portions for receiving the ends of a pin carried by a key, said two parts and said supporting plate having recesses formed therein for the passage of said ends of the pin, said key being adapted to be inserted through said openings and turned therein after the passage of the pin ends, whereby said coil spring is compressed by the key.

13. In a fastening device for a plurality of parts with openings, a lock comprising a supporting plate carried by one of said parts, a coil spring carried by said plate, a ring member carried by said coil spring, and a pin carried by said ring member, and being adapted to be engaged by recesses of a key inserted through said openings and turned therein, whereby said spring is compressed by the key.

14. In a fastening device for a plurality of parts with openings, a lock comprising a supporting plate carried by one of said parts, a coil spring carried by said plate, a ring member carried by said coil spring, and a pin carried by said ring member and having ends projecting beyond said ring member, said supporting plate comprising arms having openings formed therein and receiving said ends, said pin being adapted to be engaged by recesses of a key inserted through said openings and turned therein, whereby said coil spring is compressed by the key.

NICHOLAS WEBER.